United States Patent
Teng et al.

(10) Patent No.: US 11,958,567 B1
(45) Date of Patent: Apr. 16, 2024

(54) COAXIAL MID-DRIVE POWER DEVICE OF BICYCLE

(71) Applicant: MOBILETRON ELECTRONICS CO., LTD., Taichung (TW)

(72) Inventors: Cheng-I Teng, Taichung (TW); Yi-Hsing Hsu, Taichung (TW)

(73) Assignee: MOBILETRON ELECTRONICS CO., LTD., Taichung (TW)

( * ) Notice: Subject to any disclaimer, the term of this patent is extended or adjusted under 35 U.S.C. 154(b) by 0 days.

(21) Appl. No.: 18/221,801

(22) Filed: Jul. 13, 2023

(30) Foreign Application Priority Data

Oct. 28, 2022 (TW) .................................. 111141047

(51) Int. Cl.
*B62M 6/55* (2010.01)
*B62J 45/421* (2020.01)
(Continued)

(52) U.S. Cl.
CPC .............. *B62M 6/55* (2013.01); *B62J 45/421* (2020.02); *B62M 6/50* (2013.01); *B62M 11/02* (2013.01);
(Continued)

(58) Field of Classification Search
CPC .. G01L 5/0042; H02K 7/116; H02K 2211/03; H02K 11/33; B62M 6/55; B62M 6/50; B62M 11/02; B62J 45/421; B62J 45/411
See application file for complete search history.

(56) References Cited

U.S. PATENT DOCUMENTS 2,957,342 A * 10/1960 Hanneman ............ G01L 5/0042
73/862.041
9,616,968 B1 * 4/2017 Hu .......................... B62M 6/55
(Continued)

FOREIGN PATENT DOCUMENTS

| TW | M437304 U | 9/2012 |
| TW | M472666 U | 2/2014 |
| TW | I646016 B | 1/2019 |

OTHER PUBLICATIONS

Translation of Abstract of TWI646016, Total of 1 page, Jan. 1, 2019.
(Continued)

*Primary Examiner* — Edwin A Young
(74) *Attorney, Agent, or Firm* — Apex Juris, pllc; Tracy M Heims

(57) ABSTRACT

A coaxial mid-drive power device of a bicycle includes a reducing structure and a hollow shaft motor engaged with the reducing structure that are disposed in a motor base. An output end of the reducing structure is operatively coupled with a one-way bearing bracket with a sprocket base via a one-way bearing. A crank spindle engaged with the one-way bearing bracket through another one-way bearing penetrates through the motor base. The two one-way bearings respectively have opposite rotation directions and are respectively located on different sides, i.e., an inside and an outside, of the one-way bearing bracket. A strain gauge disposed on the crank spindle is electrically connected to an annular conductive rail assembly engaged with the crank spindle and an elastic sheet assembly on a control circuit board in the motor base, hence the strain gauge could directly obtain a change in a torque of the crank spindle.

11 Claims, 12 Drawing Sheets

(51) Int. Cl.
*B62M 6/50* (2010.01)
*B62M 11/02* (2006.01)
*G01L 5/00* (2006.01)
*H02K 7/116* (2006.01)
*H02K 11/33* (2016.01)
*B62J 45/411* (2020.01)

(52) U.S. Cl.
CPC ............ *G01L 5/0042* (2013.01); *H02K 7/116* (2013.01); *H02K 11/33* (2016.01); *B62J 45/411* (2020.02); *H02K 2211/03* (2013.01)

(56) References Cited

U.S. PATENT DOCUMENTS

2020/0063793 A1* 2/2020 Rossberger ............ B62J 45/421
2021/0171153 A1* 6/2021 Nichols ................... B62M 3/00

OTHER PUBLICATIONS

Translation of Abstract of TWM437304, Total of 1 page, Sep. 11, 2012.
Translation of Abstract of TWM472666, Total of 1 page, Feb. 21, 2014.

* cited by examiner

COAXIAL MID-DRIVE POWER DEVICE OF BICYCLE

BACKGROUND OF THE INVENTION

Technical Field

The present invention relates generally to a power device of a bicycle, and more particularly to a coaxial mid-drive power device of a bicycle.

Description of Related Art

Conventional power devices of a bicycle are, for example, the Taiwan patent No. 1646016 "Driving device of electric-assisted bicycle", the Taiwan patent No. M437304 "Central power output mechanism of electric-assisted bicycle", and the Taiwan patent No. M472666 "Treading force sensing mechanism of electric-assisted bicycle". With regard to the structure of the aforementioned patents, the bicycle is provided with a power assisted motor, wherein a pedaling torque of a user is detected by a sensing element such as a strain gauge, so that a power assisted torque outputted to a crank spindle by the motor is determined.

The power device of the bicycle can detect, by the strain gauge, the pedaling torque of the user that drives the bicycle to move forward. However, since the strain gauge is located at a chainring or a sleeve around a crank spindle, a pedaling action of the user cannot be immediately reflected during detection, and a change in the torque of the crank spindle due to pedaling cannot be obtained, so that the problem of assisted power lagging may thus be resulted while the motor is outputting a power, thereby affecting the smoothness of riding the bicycle.

BRIEF SUMMARY OF THE INVENTION

In view of this, the primary objective of the present invention is to provide a coaxial mid-drive power device of a bicycle, wherein a strain gauge is disposed on a surface of a crank spindle. An elastic sheet assembly and an annular conductive rail assembly are respectively disposed on a control circuit board and a circuit board that face each other and are electrically connected to each other during a relative rotation, so that a torque data detected by the strain gauge is sent to the control circuit board, thereby achieving the effect of controlling a motor to output an assisted power according to the torque data that is in real time.

The present invention provides a coaxial mid-drive power device of a bicycle, including a motor base, a hollow shaft motor, a reducing structure, a sprocket driving assembly, a crank spindle, and a signal transmission assembly. A shaft axis is defined on an axis of the motor base. The hollow shaft motor is disposed in the motor base and has a hollow shaft at a position of the hollow shaft motor corresponding to the shaft axis. The reducing structure is disposed in the motor base, wherein two opposite sides of the reducing structure respectively have an input end and an output end. The input end is engaged with the hollow shaft, and the output end has a sleeve. The reducing structure has a shaft hole at a position of the reducing structure corresponding to the shaft axis. The sprocket driving assembly has a one-way bearing bracket, wherein the one-way bearing bracket has a first tube section, a second tube section, and a middle section connected between the first tube section and the second tube section. An outer diameter of the first tube section is smaller than an inner diameter of the second tube section. A first one-way bearing fits around an outer peripheral surface of the first tube section. The first one-way bearing fits in an inner peripheral surface of the sleeve. An inner peripheral surface of the second tube section fits around a second one-way bearing. a rotation direction of the second one-way bearing is opposite to a rotation direction of the first one-way bearing. The second tube section is engaged with a sprocket base.

The crank spindle penetrates through the hollow shaft, the shaft hole, and the one-way bearing bracket along the shaft axis, wherein two ends of the crank spindle respective penetrate through two sides of the motor base. A side of the crank spindle has a wheel portion having a larger diameter than other portions of the crank spindle. The wheel portion fits in an inner peripheral surface of the second one-way bearing. Another side of the crank spindle has a groove, wherein an inner surface of the groove is engaged with a strain gauge. The signal transmission assembly has a rotary base fitting around a portion of the crank spindle that has the groove or is in contact with the groove. The rotary base has a ring portion, wherein the ring portion is engaged with a circuit board electrically connected to the strain gauge. A control circuit board electrically connected to the hollow shaft motor is fixed in the motor base, wherein the circuit board and the control circuit board face each other. An elastic sheet assembly is disposed on either the circuit board or the control circuit board, and an annular conductive rail assembly is disposed on a surface of the other one of the circuit board and the control circuit board. The elastic sheet assembly elastically abuts against the annular conductive rail assembly in a direction parallel to the shaft axis to be electrically connected to the annular conductive rail assembly.

The present invention is mounted on the bicycle in use. When a pedal is pedaled to rotate the crank spindle via a crank, the crank spindle drives the second one-way bearing, through the wheel portion of the crank spindle, to simultaneously rotate the one-way bearing bracket and the sprocket base from the inside of the second tube section, and the rotary base and the circuit board could be driven to rotate relative to the fixed control circuit board along with the crank spindle. In this way, the strain gauge on the surface of the crank spindle immediately detects a torque of the crank spindle due to an applied force, and the torque data is immediately sent to the control circuit board through friction contact between the elastic sheet assembly and the annular conductive rail assembly on the surface of the circuit board. An electric assisted power outputted by the hollow shaft motor is determined and controlled according to a magnitude of the torque. The output end of the reducing structure drives the first one-way bearing to simultaneously rotate one-way bearing bracket and the sprocket base from the outside of the first tube section, thereby achieving the effect of driving the bicycle to move forward by the manpower along with the electric assisted power.

With the aforementioned design, the strain gauge is disposed on the surface of the crank spindle, so as the strain gauge could immediately detect and obtain the torque generated by the crank spindle due to the applied force, and to send the torque data to the control circuit board, so that the coaxial mid-drive power device of the bicycle could immediately control the hollow shaft motor to output the power based on the need, thereby enhancing the smoothness of riding the bicycle. Furthermore, the elastic sheet assembly and the annular conductive rail assembly could respectively be radially disposed on the surface of the control circuit board facing the circuit board and the surface of the circuit board facing the control circuit board, so that the volume of the control circuit board and the circuit board occupied in the direction of the shaft axis L is small, thereby reducing the axial length of the coaxial mid-drive power device of the bicycle.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
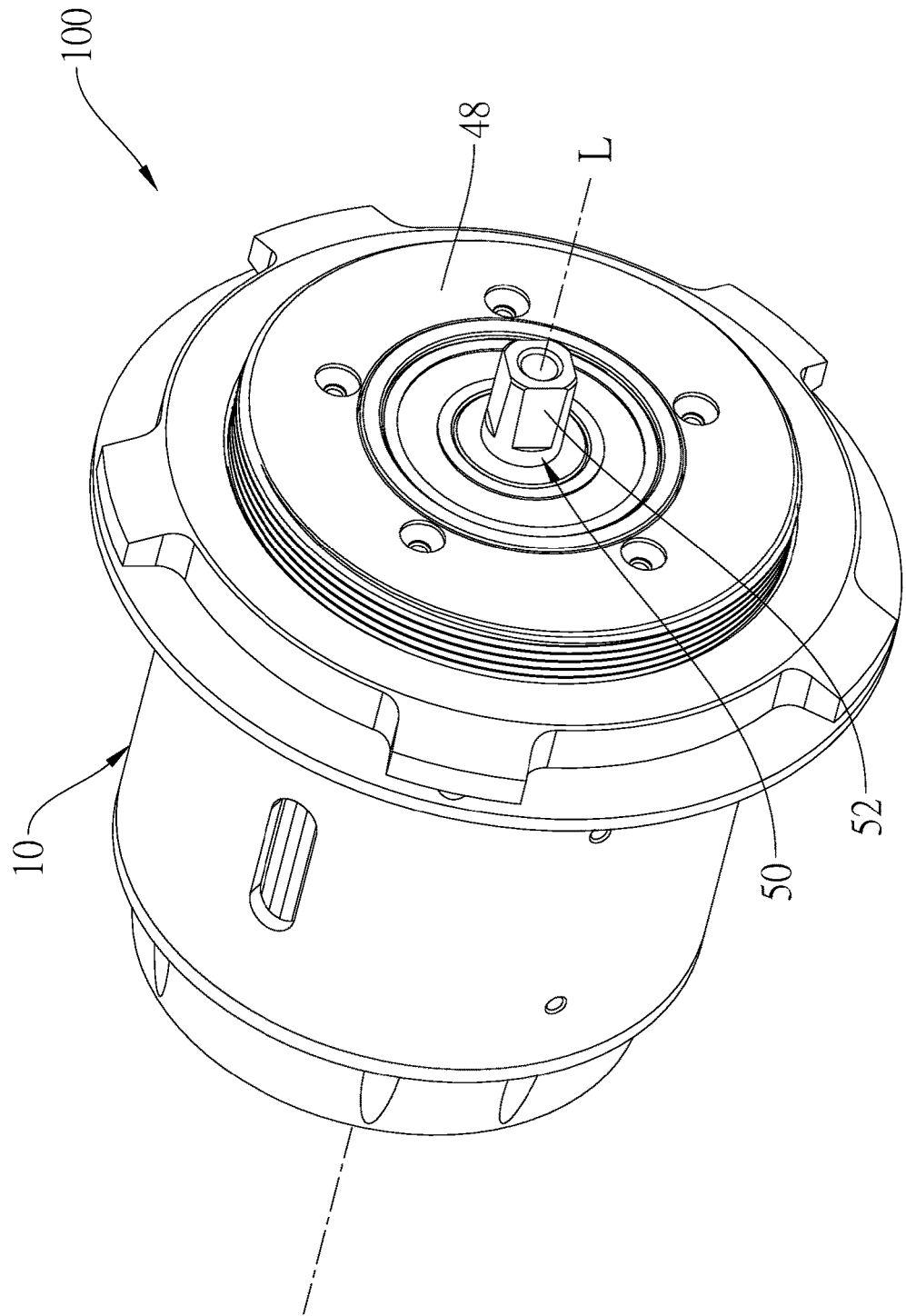
FIG. 1 is a perspective view of the coaxial mid-drive power device according to an embodiment of the present invention.

A coaxial mid-drive power device 100 of a bicycle according to an embodiment of the present invention is illustrated in FIG. 1 to FIG. 5 and includes a motor base 10, a hollow shaft motor 20, a reducing structure 30, a sprocket driving assembly 40, a crank spindle 50, and a signal transmission assembly 60.

The motor base 10 is a cylinder that is horizontally arranged and has a motor base tube 12. The motor base tube 12 has a right-end edge and a left-end edge, wherein the right-end edge of the motor base tube 12 is engaged with a front cover 14 that is annular. A right spacer ring 141 and a right bearing 14 respectively fit in a left side and a right side of an inner peripheral surface of the front cover 14. The left-end edge of the motor base tube 12 is engaged with a rear cover 16, wherein a middle of the rear cover 16 has a left bearing bracket 161. A left bearing 162 fits in the left bearing bracket 161. A shaft axis L is defined on an axis of the motor base 10. The shaft axis L penetrates through a center of the left bearing 162 and a center of the right bearing 142.

Figure 6:
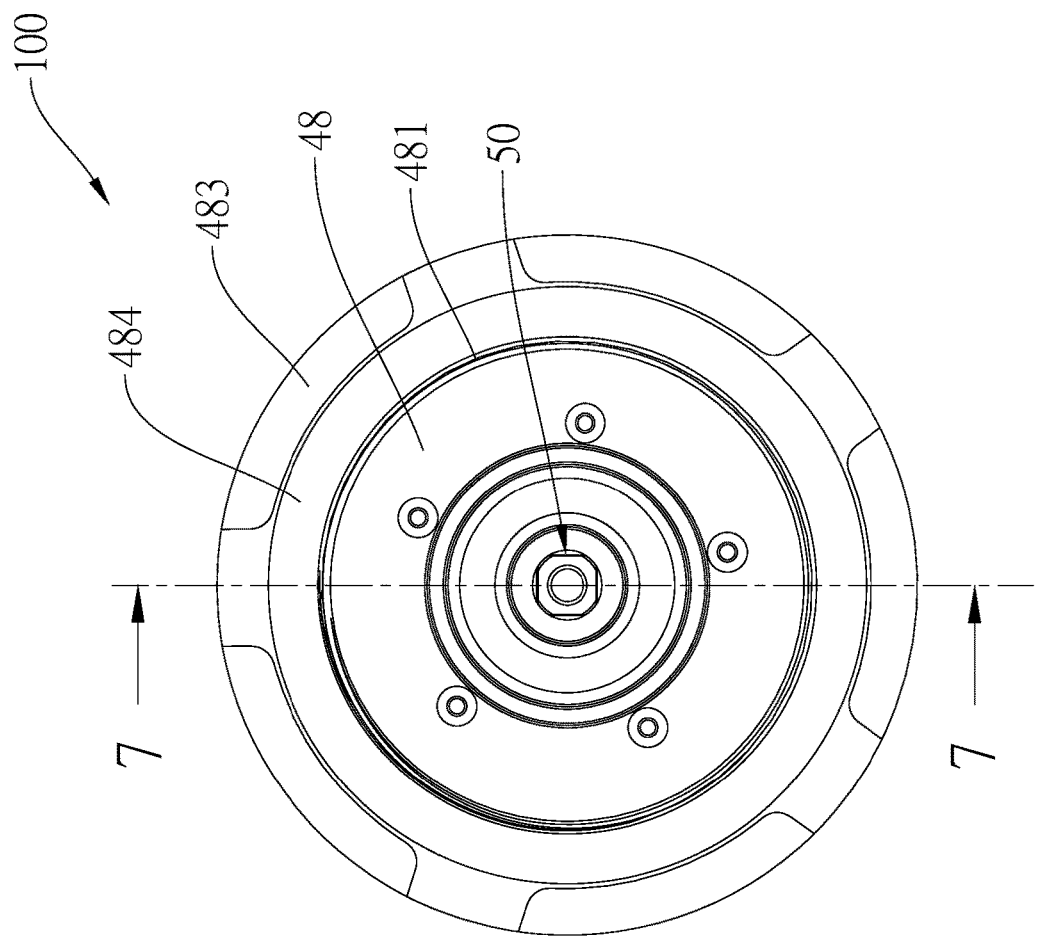
FIG. 6 is a front view of the coaxial mid-drive power device according to the embodiment of the present invention.
Figure 7:
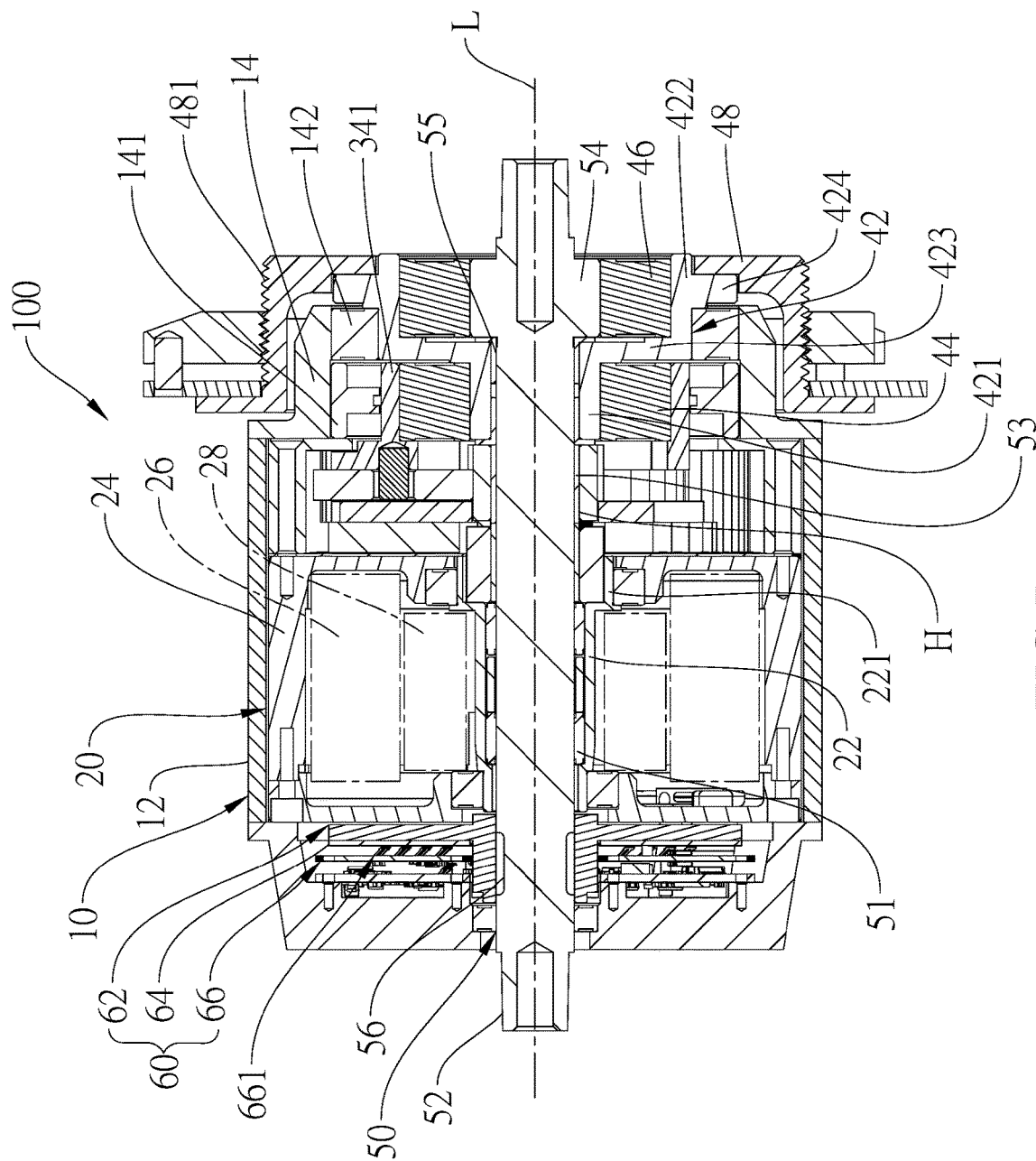
FIG. 7 is a sectional view along the 7-7 line in FIG. 6.

The hollow shaft motor 20 is disposed in the motor base 10. More specifically, the hollow shaft motor 20 is disposed on a left side in the motor base tube 12, and the hollow shaft motor 20 has a hollow shaft 22, for transmission, at a position of the hollow shaft motor corresponding to the shaft axis L. The reducing structure 30 is disposed in the motor base 10. More specifically, the reducing structure 30 is disposed on a right side in the motor base tube 12. Two opposite sides of the reducing structure 30 respectively have an input end 32 and an output end 34, wherein the input end 32 is engaged with the hollow shaft 22 of the hollow shaft motor 20, and the output end 34 has a sleeve 341. Referring to FIG. 6 and FIG. 7, the reducing structure 30 has a shaft hole H at a position of the reducing structure 30 corresponding to the shaft axis L, wherein the shaft hole H communicates with the hollow shaft 22.

Referring to FIG. 1 to FIG. 3, FIG. 6, and FIG. 7, the sprocket driving assembly 40 includes a one-way bearing bracket 42, a first one-way bearing 44, a second one-way bearing 46, and a sprocket base 48. The one-way bearing bracket 42 is a tube surrounding the shaft axis L and has a first tube section 421, a second tube section 422, and a middle section 423 connected between the first tube section 421 and the second tube section 422. An outer diameter of the first tube section 421 is smaller than an inner diameter of the second tube section 422. At least a portion of an outer peripheral surface of the second tube section 422 fits in an inner peripheral surface of the right bearing 142 for engaging.

The first one-way bearing 44 fits around an outer peripheral surface of the first tube section 421 for fixing. The first one-way bearing 44 fits in an inner peripheral surface of the sleeve 341 of the reducing structure 30 for engaging. The right spacer ring 141 is disposed between an outer peripheral surface of the sleeve 341 and the inner peripheral surface of the front cover 14. The reducing structure 30 could drive, by the sleeve 341 of the output end 34 the one-way bearing bracket 42 to rotate through the first one-way bearing 44. The second one-way bearing 46 fits in an inner peripheral surface of the second tube section 422 for engaging. A rotation direction of the second one-way bearing 46 mounted is opposite to a rotation direction of the first one-way bearing 44 mounted. The sprocket base 48 is engaged with the second tube section 422 of the one-way bearing bracket 42 and is adapted to be engaged with a sprocket of the bicycle.

The crank spindle 50 penetrates through the hollow shaft 22, the shaft hole H, and a center of the one-way bearing bracket 42 along the shaft axis L, so that the crank spindle 50 is freely rotatable relative to the hollow shaft motor 20 and the sprocket driving assembly 40. A right-end of the crank spindle 50 penetrates through a center of the front cover 14. A left-end of the crank spindle 50 penetrates through the left bearing 162 of a center of the rear cover 16. The left-end and a right-end of the crank spindle 50 respectively penetrate out of the motor base 10 to form an engaging portion 52 adapted to be engaged with a crank and a pedal of the bicycle.

A side of the crank spindle 50, for example, a right side of the crank spindle 50 in the current embodiment, has a wheel portion 54 having a larger diameter than other portions of the crank spindle 50 and corresponding to the second one-way bearing 46. The wheel portion 54 fits in an inner peripheral surface of the second one-way bearing 46, so that when the pedal is pedaled to drive the crank spindle 50 to rotate, the crank spindle 50 could drive, by the wheel portion 54 of the crank spindle 50, the one-way bearing bracket 42 and the sprocket base 48 to rotate through the second one-way bearing 46, thereby allowing the sprocket and a chain of the bicycle that are mounted on the sprocket base 48 to operate normally. Another side of the crank spindle 50 opposite to the wheel portion 54, for example, a left side of the crank spindle 50 in the current embodiment, has a groove 56. The groove 56 is disposed at a position of the crank spindle 50 between the hollow shaft motor 20 and the rear cover 16, wherein an inner surface of the groove 56 is engaged with a strain gauge 561.

Referring to FIG. 2, FIG. 3, FIG. 5, and FIG. 7, the signal transmission assembly 60 includes a rotary base 62, a circuit board 64, and a control circuit board 66. In the current embodiment, the rotary base 62 is a disc body, and is screwed on or urged against the crank spindle 50 through a fixing member, so that the rotary base 62 fits around to be engaged with the portion of the crank spindle 50 having the groove 56 for fixing. The rotary base 62 has a ring portion 621, wherein a surface of the ring portion 621 is perpendicular to the shaft axis L. In other embodiments, the rotary base 62 could fit around to a portion of the crank spindle 50 being in contact with the groove 56 for engaging and fixing. The circuit board 64 is engaged with the surface of the ring portion 621 and is electrically connected to the strain gauge 561 through an electric wire connected between the circuit board 64 and the strain gauge 561. The control circuit board 66 is fixed in the motor base 10 and the control circuit board 66 and the circuit board 64 face each other. In the current embodiment, the control circuit board 66 is fixed on an inner surface of the rear cover 16, and a fixed interval is formed between the control circuit board 66 and the circuit board 64 as an example.

The control circuit board 66 is electrically connected to the hollow shaft motor 20 and is adapted to receive a signal of a torque of the crank spindle 50 immediately detected by the strain gauge 561, and then to control, through intelligent determination, the hollow shaft motor 20 to output an electric assisted power. An elastic sheet assembly 661 is disposed on the control circuit board 66, and an annular conductive rail assembly 641 is disposed on a surface of the circuit board 64 around the shaft axis L. The elastic sheet assembly 661 elastically abuts against the annular conductive rail assembly 641 in a direction parallel to the shaft axis L, so that the circuit board 64 and the control circuit board 66 could remain electrically connected to each other when the circuit board 64 and the control circuit board 66 that face each other rotate around the shaft axis L. In this way, the signal of the torque of the crank spindle 50 immediately detected by the strain gauge 561 could be sent and fed back to the control circuit board 66 through the circuit board 64, the annular conductive rail assembly 641, and the elastic sheet assembly 661. In addition, both the control circuit board 66 and the circuit board 64 are an annular plate, and the elastic sheet assembly 661 and the annular conductive rail assembly 641 could be respectively and radially arranged on a surface of the control circuit board 66 facing the circuit board 64 and a surface of the circuit board 64 facing the control circuit board 66, so that a volume of the structures between the control circuit board 66 and the circuit board 64 occupied in the direction parallel to the shaft axis L is small, thereby reducing an axial length of the coaxial mid-drive power device 100 of the bicycle.

Apart from the aforementioned embodiment, in which the elastic sheet assembly 661 is disposed on the control circuit board 66 and the annular conductive rail assembly 641 is disposed on the circuit board 64, in other embodiments, the elastic sheet assembly 661 could be changed to be disposed on the circuit board 64, and the annular conductive rail assembly 641 that is around the shaft axis L could be changed to be disposed on the surface of the control circuit board 66; at this time, the elastic sheet assembly 661 still elastically abuts against the annular conductive rail assembly 641 in the direction parallel to the shaft axis L, so that the circuit board 64 and the control circuit board 66 could remain electrically connected to each other when the circuit board 64 and the control circuit board 66 that face each other rotate around the shaft axis L.

When the embodiment of the present invention is used, the coaxial mid-drive power device 100 of the bicycle is mounted at a bottom bracket of a bicycle frame, the crank and the pedal are engaged with the engaging portion 52 on the right-end and the left-end of the crank spindle 50, the sprocket of the bicycle fits around a periphery of the sprocket base 48 for engaging and fixing, and the chain is disposed between the sprocket and a flywheel of a rear wheel of the bicycle. When the embodiment of the present invention is used, the bicycle is driven to move forward by a manpower or an electric assisted power. Referring to FIG. 6 and FIG. 7, the manpower situation is that when a user pedals to rotate the crank spindle 50, crank spindle 50 is rotated to drive, by the wheel portion 54 of the crank spindle, the second one-way bearing 46 to rotate; the second one-way bearing 46 drives the second tube section 422 of the one-way bearing bracket 42 from an inside of the one-way bearing bracket 42 to simultaneously rotate one-way bearing bracket 42 and the sprocket base 48, so that the chain and the flywheel are driven to rotate, thereby driving the bicycle to move forward.

Referring to FIG. 2, FIG. 3, FIG. 5 and FIG. 7, the electric assisted power situation is that when the user pedals to rotate the crank spindle 50, the rotary base 62 and the circuit board 64 rotate along with the crank spindle 50, and thus rotate relative to the control circuit board 66 fixed to the motor base 10. During the process, the strain gauge 561 immediately detects the torque generated by the crank spindle 50 due to an applied force and sends the signal to the circuit board 64. As the elastic sheet assembly 661 is in friction contact with the annular conductive rail assembly 641 on the surface of the circuit board 64, the circuit board 64 and the control circuit board 66 could remain electrically connected to each other despite the circuit board 64 rotates relative to the control circuit board 66. In this way, the signal of the torque detected by the strain gauge 561 is continuously sent to the control circuit board 66, so that the control circuit board 66 continuously receives the signal of the torque of the crank spindle 50 immediately detected by the strain gauge 561, thereby determining and controlling, according to a magnitude of the torque, a magnitude of the electric assisted power outputted by the hollow shaft motor 20.

When the hollow shaft motor 20 outputs the electric assisted power, the hollow shaft 22 drives the input end 32 of the reducing structure 30 to rotate the first one-way bearing 44 through the output end 34 after being reduced by the reducing structure 30; the first one-way bearing 44 drives the first tube section 421 of the one-way bearing bracket 42 from an outside of the one-way bearing bracket 42 to simultaneously rotate the one-way bearing bracket 42 and the sprocket base 48, so that the chain and the flywheel are driven to rotate, thereby driving the bicycle to move forward; in this way, the hollow shaft motor 20 could quickly respond to the torque of the crank spindle 50 and immediately output the electric assisted power, so that the user could ride the bicycle more smoothly. In addition, when the one-way bearing bracket 42 and the sprocket base 48 are driven to rotate by the manpower or the electric assistance power, the second one-way bearing 46 disposed on an inner peripheral surface of the one-way bearing bracket 42 drives the one-way bearing bracket 42 to rotate, or the first one-way bearing 44 disposed on an outer peripheral surface of the one-way bearing bracket 42 drives the one-way bearing bracket 42 to rotate, so that a force transmission path of the manpower and a force transmission path of the electric assisted power are respectively on the inside and the outside of the one-way bearing bracket 42, thereby preventing transmission structures of different powers from interfering with each other.

Figure 8:
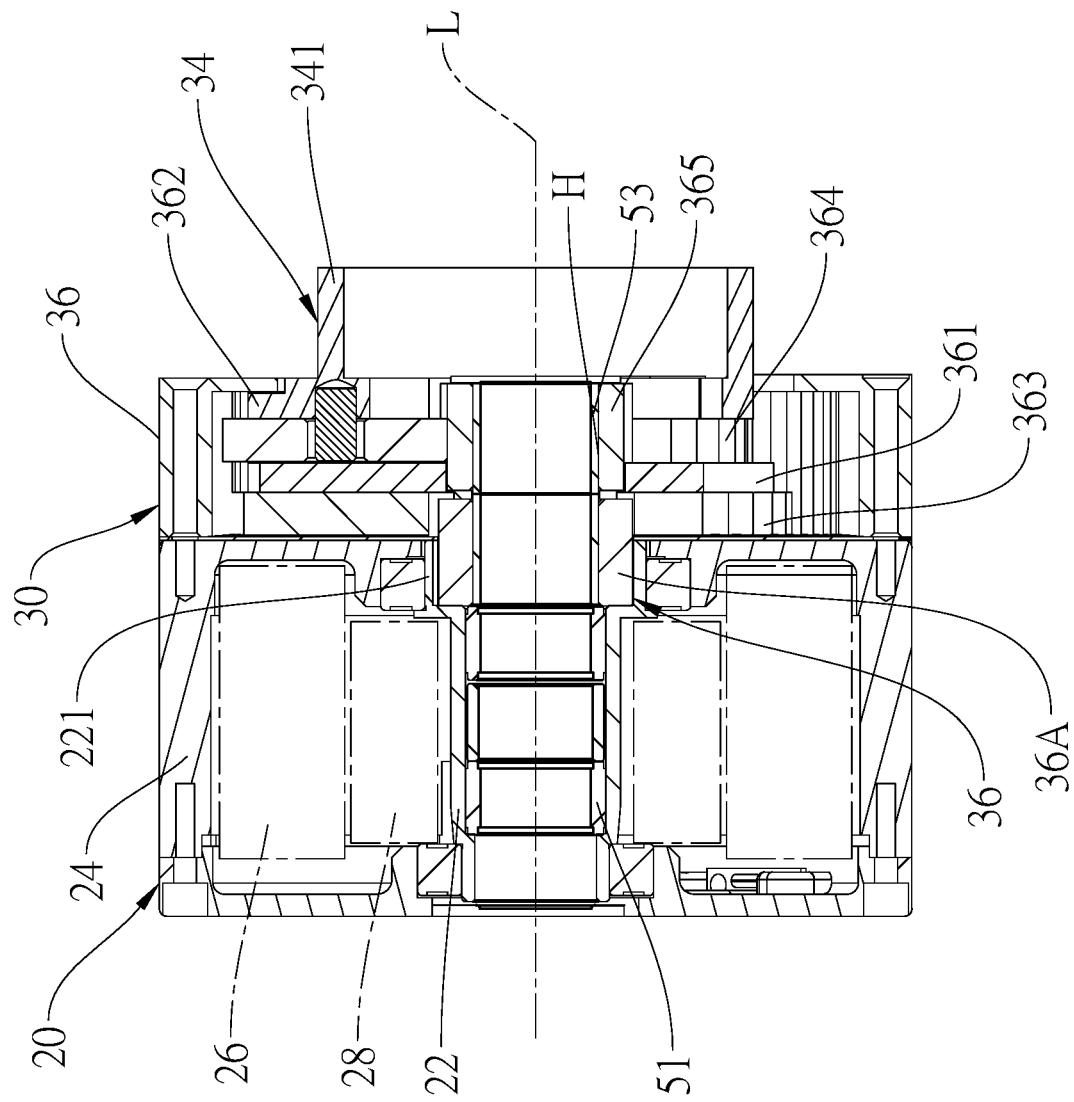
FIG. 8 is a sectional view of the hollow shaft motor and the reducing structure shown in FIG. 7.
Figure 9:
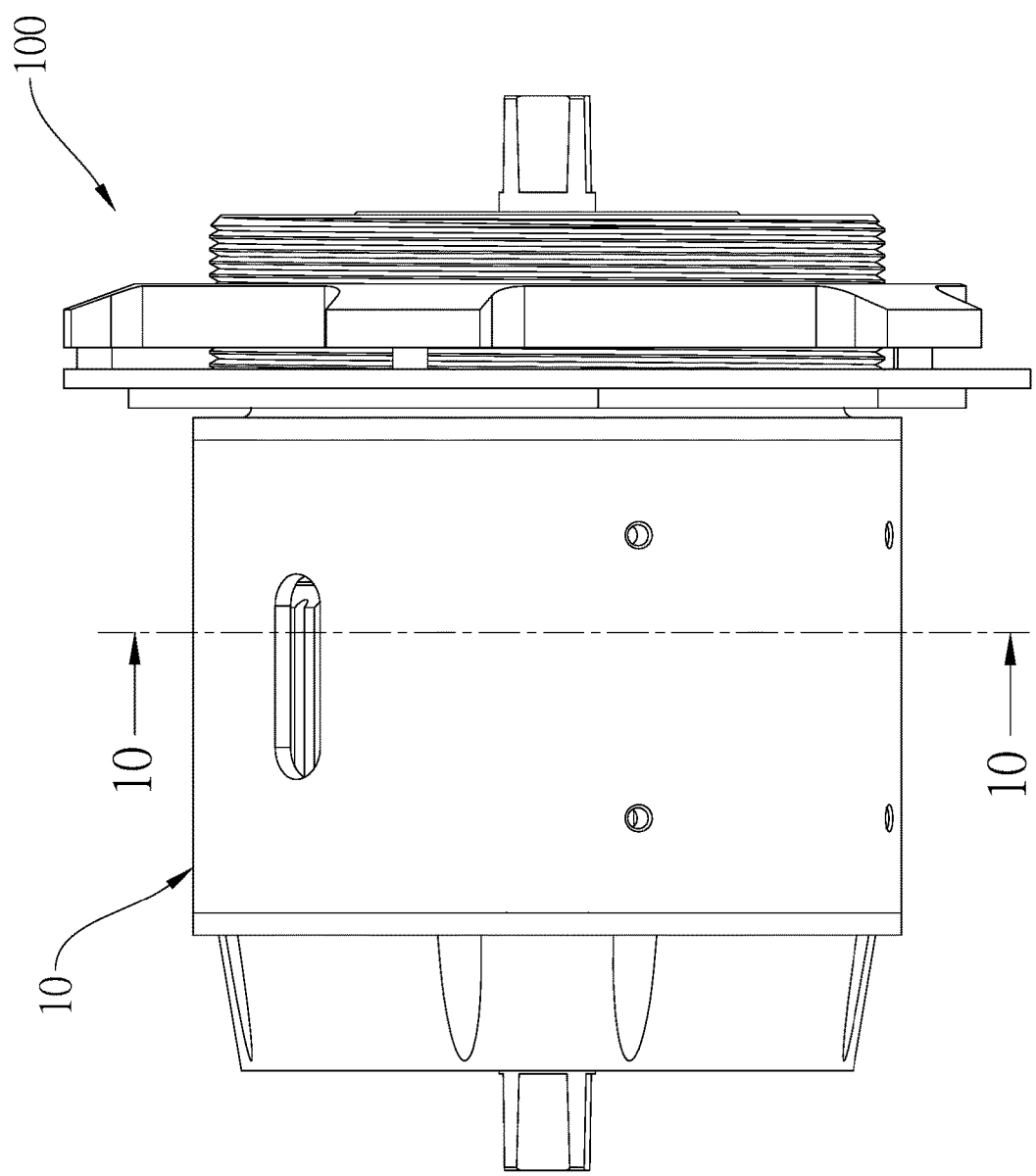
FIG. 9 is a side view of the coaxial mid-drive power device according to the embodiment of the present invention.
Figure 10:
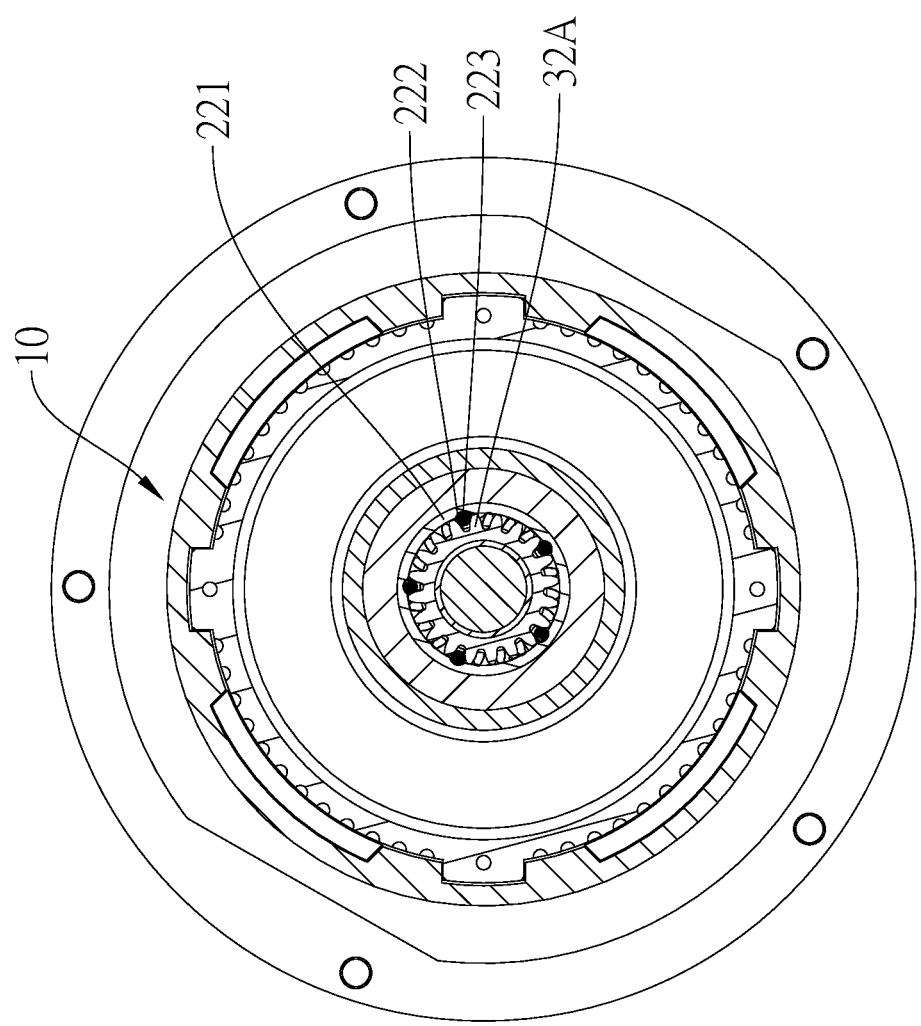
FIG. 10 is a sectional view along the 10-10 line in FIG. 9.

Referring to FIG. 7 and FIG. 8, a first bearing 51 is disposed between the crank spindle 50 and an inner peripheral surface of the hollow shaft 22, a second bearing 52 is disposed between the crank spindle 50 and a hole wall of the shaft hole H, and a third bearing 55 is disposed between the crank spindle 50 and an inner peripheral surface of the first tube section 421 of the one-way bearing bracket 42, so that the crank spindle 50 could penetrate through the hollow shaft 22, the shaft hole H and the center of the one-way bearing bracket 42 along the shaft axis L. In the current embodiment, the first bearing 51, the second bearing 53 and the third bearing 55 are respectively a sliding bearing.

Referring to FIG. 2, FIG. 3, FIG. 5, and FIG. 7, the rotary base 62 has a cylindrical portion 622, wherein the cylindrical portion 622 fits around the portion of the crank spindle 50 having the groove 56, and is fixed to the crank spindle 50 by being screwed on or urged against the crank spindle 50 through the fixing member that passes through the cylindrical portion 622. The ring portion 621 is engaged around a periphery of the cylindrical portion 622. The circuit board 64 is a circuit board that is annular. When the circuit board 64 is engaged with the surface of the ring portion 621, the circuit board 64 fits around the periphery of the cylindrical portion 622. The groove 56 is an annular groove that surrounds a periphery of the crank spindle 50. A through opening 623 penetrates through a position of the cylindrical portion 622 corresponding to the groove 56, and an opening 624 communicating with the through opening 623 penetrates through the ring portion 621. The electric wire connected between the circuit board 64 and the strain gauge 561 extends outward from the through opening 623 to the opening 624 to be electrically connected to the circuit board 64. In other embodiments, the opening 624 could be omitted, and the electric wire is directly connected to the circuit board 64 after extending out of the through opening 623.

The elastic sheet assembly 661 includes four elastic sheets 662 linearly arranged in a radial direction of the crank spindle 50. The annular conductive rail assembly 641 has four annular conductive rails 642 matching with the number of elastic sheets 662, wherein each of the annular conductive rails 642 has a different diameter and the diameter of the annular conductive rail 642 increases outward along the radial direction of the crank spindle 50 (i.e., the diameter of the annular conducive rail 642 that is the outermost in the radial direction of the crank spindle 50 is the largest and the diameter of the annular conducive rail 642 that is the innermost in the radial direction of the crank spindle 50 is the smallest). Each of the elastic sheets 662 elastically abuts against one of the conductive rails 642. In other embodiments, the elastic sheet assembly 661 could include a plurality of elastic sheets 662 (for example, two or more); at that time, the conductive rails 642 of the annular conductive rail assembly 641 could be configured to have a diameter matching with the elastic sheets 662 and include the number of the conductive rails 642 the same number as the number of the elastic sheets 662.

In addition, in order to improve an electrical conduction effect between the circuit board 64 and the control circuit board 66, the control circuit board 66 in the current embodiment is further configured to be an annular circuit board having an area the same as an area of the first one-way bearing 44, and a plurality of elastic sheet assemblies 661 are disposed on the control circuit board 66 around the shaft axis L. For example, in the current embodiment, two elastic sheet assemblies 661 are additionally provided in addition to the original elastic sheet assembly 661, and the number and the arrangement of the elastic sheets 662 of each of the elastic sheet assemblies 661 are the same, so that each of the elastic sheet assemblies 661 could elastically abut against the annular conductive rail assembly 641 in the same manner, and each of the conductive rails 642 could be electrically connected, at the same time, to the elastic sheets 662 of the elastic sheet assemblies 661 that are arranged in the same sequence; for example, in the current embodiment, a conductive rail 642 is in contact, at the same time, with three elastic sheets 662 that are arranged in the same sequence.

The hollow shaft motor 20, the reducing structure 30, the one-way bearing bracket 42, and the crank spindle 50 are coaxial. The hollow shaft motor 20 has a housing 24 and is fixed in the motor base tube 12 of the motor base 10 through the housing 24. The hollow shaft 22 penetrates through an axis of the housing 24. A stator 26 is fixed on a periphery in the housing 24. A rotor 28 is engaged with an outer peripheral surface of the hollow shaft 22 for fixing. An end of the hollow shaft 22 facing the reducing structure 30 forms a large-diameter portion 221 having an inner diameter greater than other portions of the hollow shaft 22. An inner peripheral surface of the large-diameter portion 221 is in a circular shape, wherein a plurality of keyways 222 are formed at intervals around the inner peripheral surface of the large-diameter portion 221.

Referring to FIG. 4, FIG. 7, FIG. 9, and FIG. 10, the reducing structure 30 is a planetary gear reducer and has an internal gear ring 36, wherein the reducing structure 30 is fixed in the motor base tube 12 of the motor base 10 through the internal gear ring 36. The internal gear ring 36 is screwed on a right-end surface of the housing 24 of the hollow shaft motor 20. A first-stage carrier 361 and a second-stage carrier 362 are respectively disposed on a left side and a right side in the internal gear ring 36. A plurality of first planetary gears 363 is engaged with a side surface of the first-stage carrier 361 that faces away from the second-stage planet gear carrier 362, for example, a left side surface of the first-stage carrier 361 in the current embodiment, and is arranged around the shaft axis L, wherein an outside of each of the first planetary gears 363 is meshed with the internal gear ring 36. A plurality of second planetary gears 364 is engaged between another side surface of the first-stage carrier 361, i.e., a right side surface of the first-stage carrier 361, and the second-stage carrier 362, and is arranged around the shaft axis L, wherein an outside of each of the second planetary gears 364 is meshed with the internal gear ring 36. An inside of each of the second planetary gears 364 is meshed with a sun gear 365. The sleeve 341 is concentrically engaged with a periphery of a right side surface of the second-stage carrier 362, so that the sleeve 341 extends rightward from a coverage range of the internal gear ring 36 to a surrounding range of the front cover 14.

The input end 32 of the reducing structure 30 has a driving gear 32A serving as the sun gear 365, and the shaft hole H of the reducing structure 30 penetrates through a center of the driving gear 32A, a center of the first-stage carrier 361, and a center of the second-stage carrier 362. A right-half part of the driving gear 32A is meshed with the inside of each of the first planetary gears 362, and a left-half part of the driving gear 32A extends into the large-diameter portion 221 of the hollow shaft 22. A plurality of key blocks 223 respectively fits in one of the keyways 222, wherein an inside of each of the key blocks 223 fits in a periphery of the driving gear 32A for fixing, so that the hollow shaft 22 is engaged with the input end 32 of the reducing structure 30.

Figure 11:
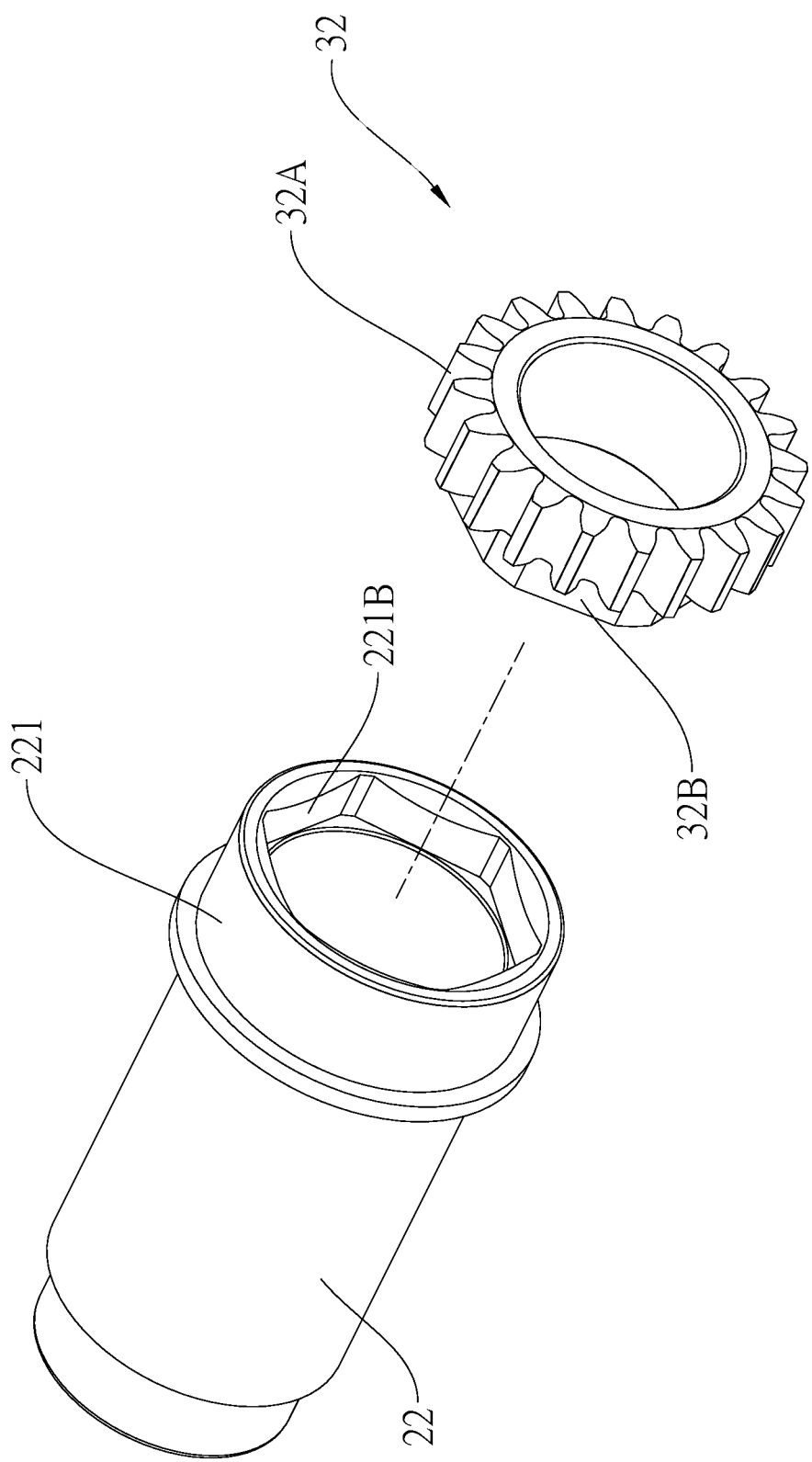
FIG. 11 is an exploded view of the hollow shaft and the driving gear according to another embodiment of the present invention.
Figure 12:
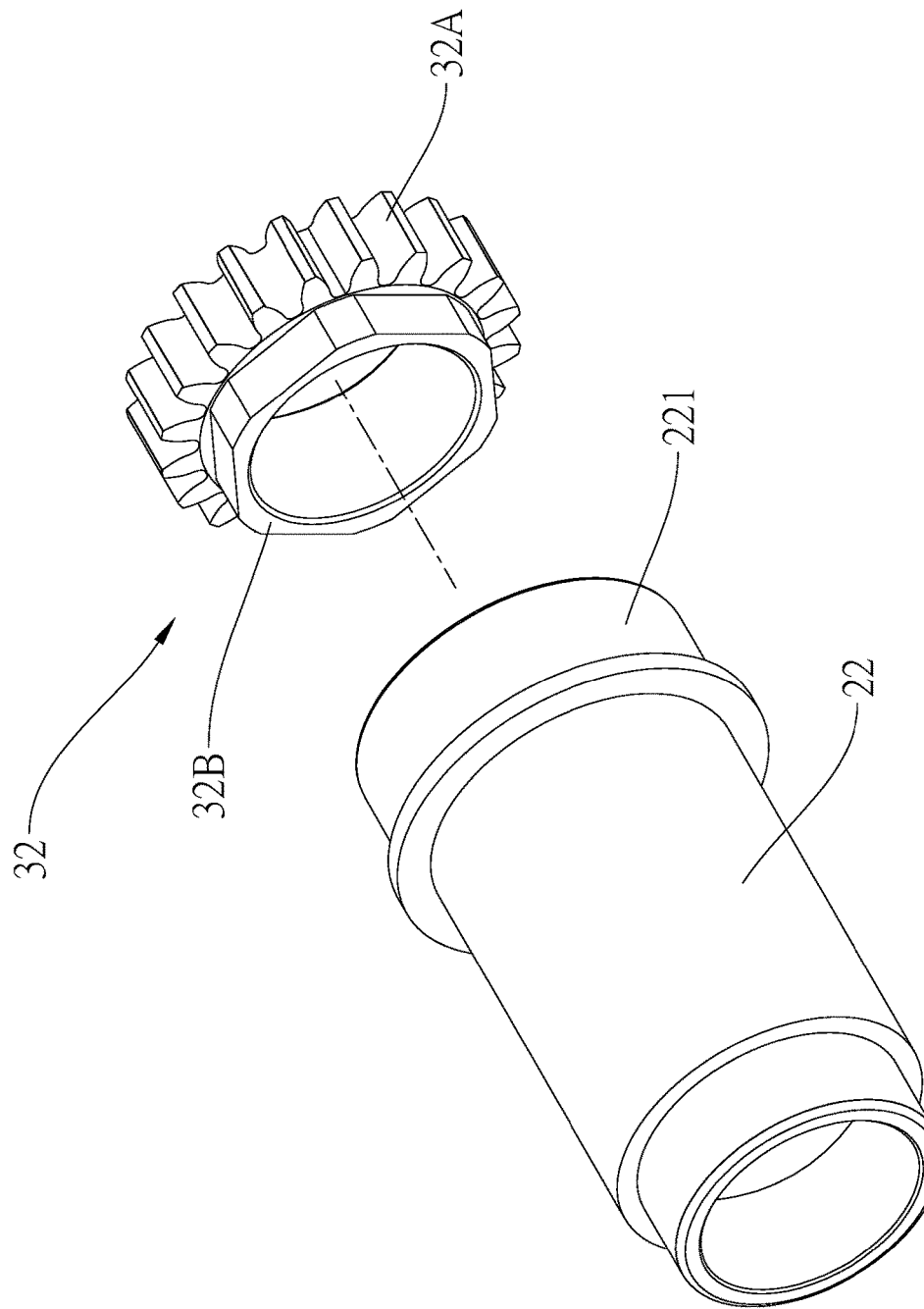
FIG. 12 is an exploded view of FIG. 11 seen from another direction.

In the aforementioned embodiment, the left-half part of the driving gear 32A of the input end 32 is engaged with the key blocks 223, so that the driving gear 32A is engaged with the large-diameter 221 of the hollow shaft 22. Referring to FIG. 11 and FIG. 12, in another embodiment of the present invention, the keyways 222 could be omitted, and the inner peripheral surface of the large-diameter portion 221 could be changed from being in a circular shape to a slot 221B in a hexagonal shape; the driving gear 32A is configured to only have the right-half part and a fitting ring 32B corresponding to the large-diameter portion 221; the fitting ring 32B is a hexagonal ring body having an outer peripheral surface matching with a wall surface of the slot 221B, the fitting ring 32B is concentrically engaged with a side wall of the driving gear 32A, and an outer diameter of the fitting ring 32B is smaller than a diameter of the driving gear 32A; the driving gear 32A fits in the slot 221B through the fitting ring 32B, so that the hollow shaft 22 is engaged with the input end 32.

In the another embodiment, in which the slot 221B is a hexagonal slot, the slot 221B could also be a quadrilateral slot, a pentagonal slot, a circular slot having two parallel surfaces respectively on two opposite sides of a periphery of the slot, or other non-circular slot; at that time, the fitting ring 32B concentrically connected to the side wall of the driving gear 32A is then configured to be the ring body that has the outer peripheral surface matching with the wall surface of the slot 221B, so that the driving gear 32A could be engaged with the hollow shaft 22 by the fitting ring 32B of the driving gear 32A fitting in the slot 221B.

In the embodiment, the driving gear 32A is engaged with the hollow shaft 22 by the left-half part of the driving gear 32A entering the large-diameter portion 221. In the another embodiment, the driving gear 32A is engaged with the hollow shaft 22 by the fitting ring 32B connected to the side wall of the driving gear 32A entering the large-diameter portion 221. Compared with a conventional technique that a gear is forced on a periphery of a motor shaft (the hollow shaft 22), the driving gear 32A of the present invention that is axially engaged with the hollow shaft 22 could be configured to have a smaller diameter. When a tooth size is equivalent between the present invention and the conventional technique, the driving gear 32A of the present invention has a smaller number of teeth. When the internal gear ring is the same, a reduction ratio of a planetary reducer (the reducing structure 30) is determined by the number of teeth of a sun gear (the driving gear 32A). The smaller the number of teeth of the sun gear, the higher the reduction ratio; and the larger the number of teeth of the sun gear, the lower the reduction ratio. As the driving gear 32A of the present invention has a smaller number of teeth, the reduction ratio of the reducing structure 30 could be increased.

Figure 2:
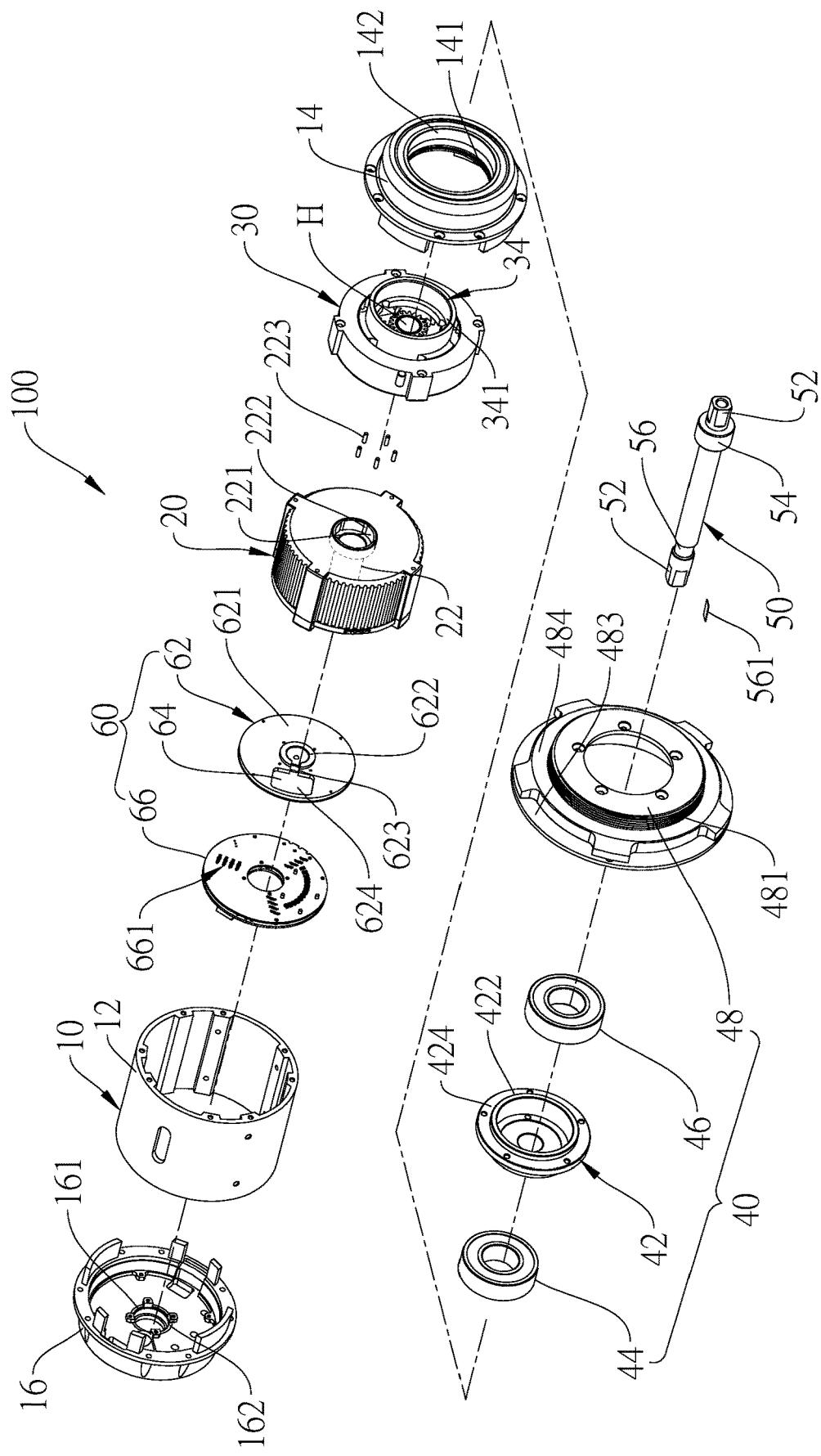
FIG. 2 is an exploded view of the coaxial mid-drive power device according to the embodiment of the present invention.
Figure 3:
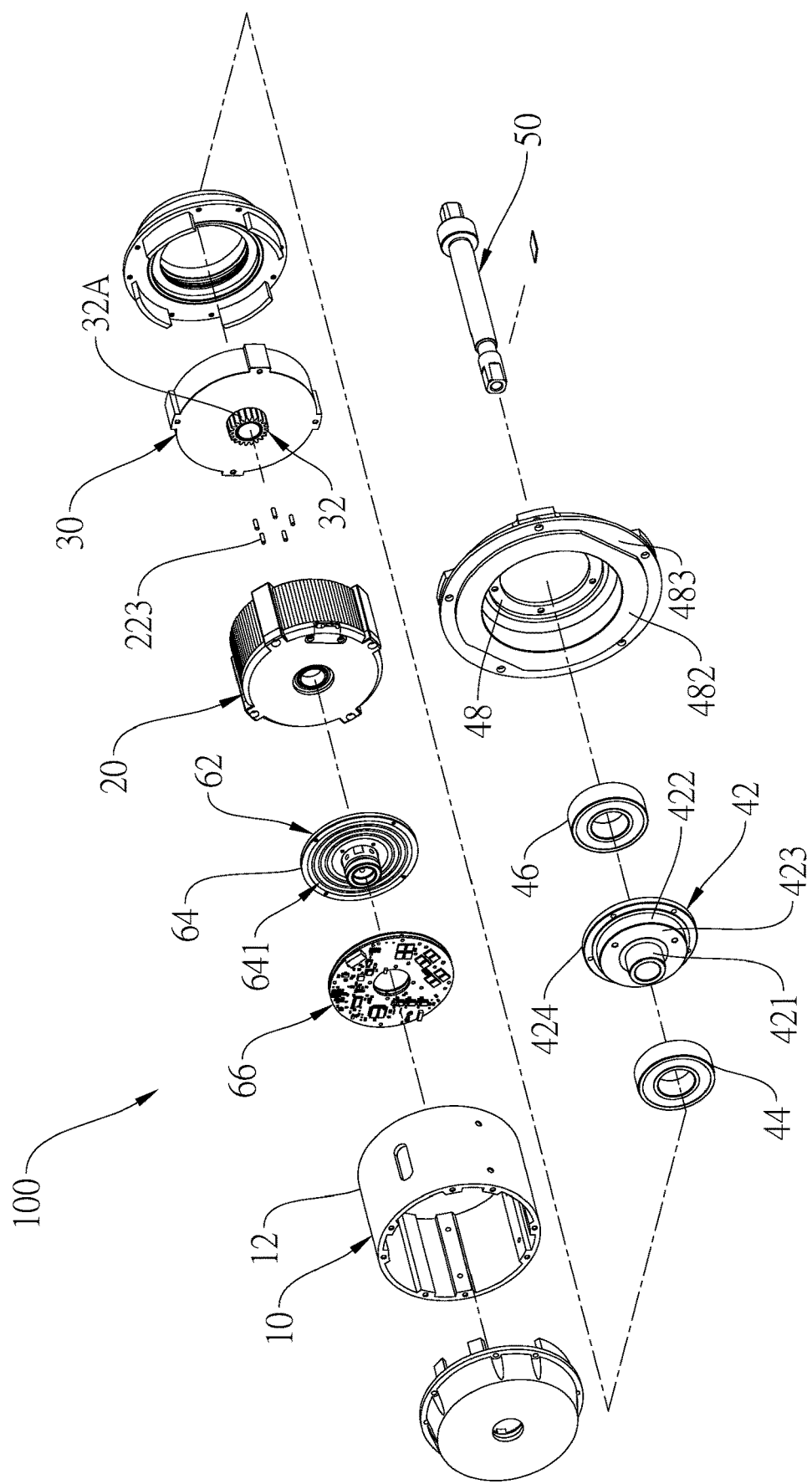
FIG. 3 is an exploded view of FIG. 2 seen from another direction.
Figure 4:
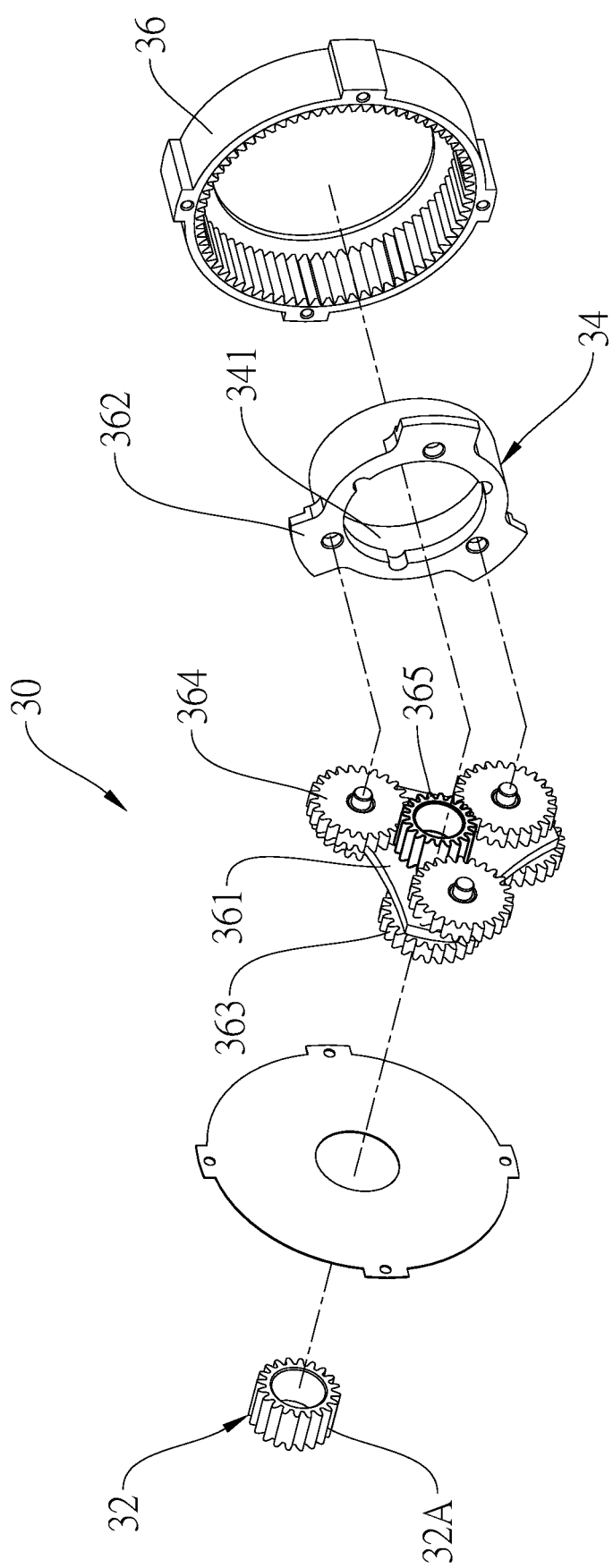
FIG. 4 is an exploded view of the reducing structure according to the embodiment of the present invention.
Figure 5:
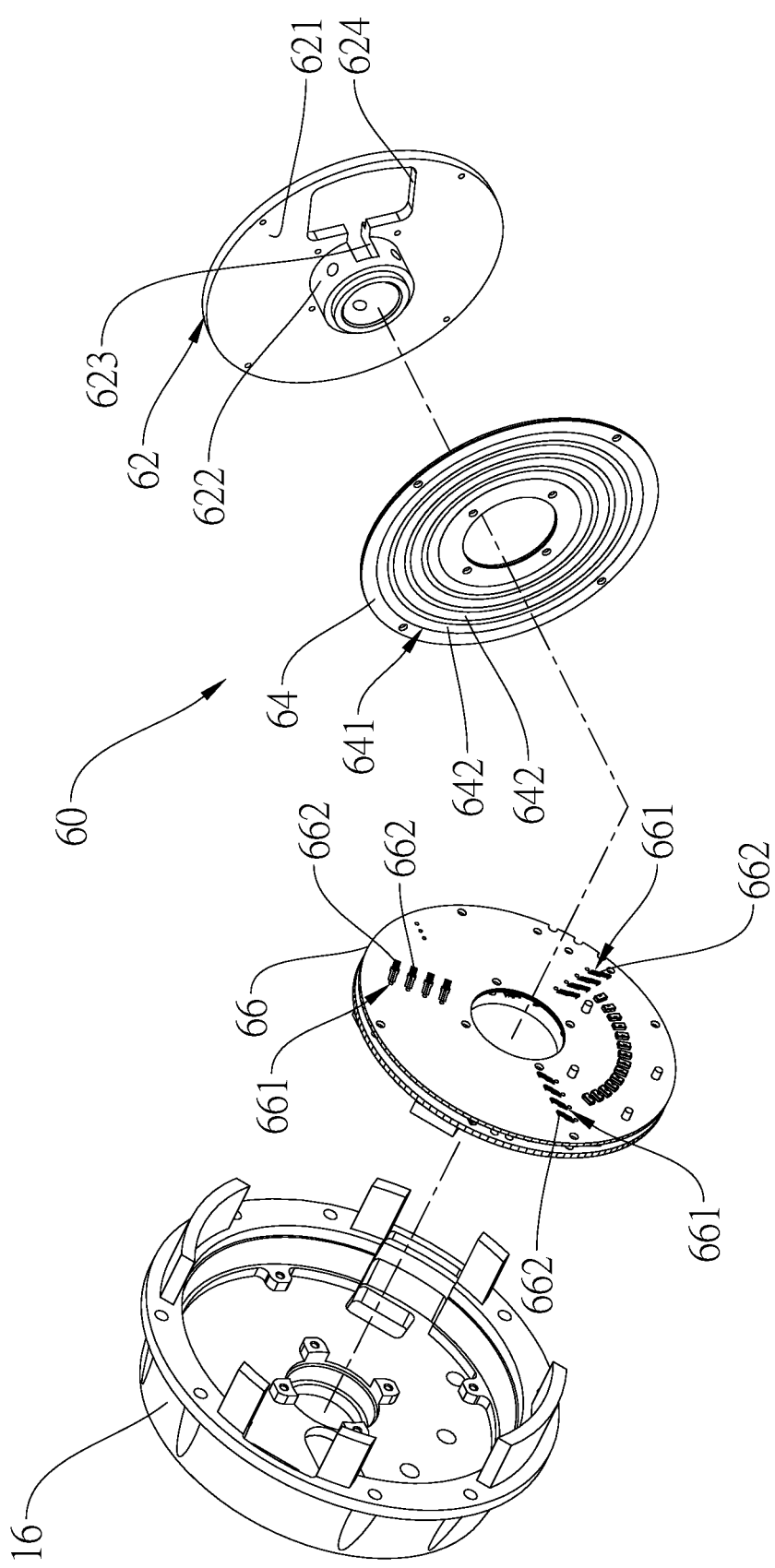
FIG. 5 is an exploded view of the signal transmission assembly according to the embodiment of the present invention.

Referring to FIG. 2, FIG. 3, and FIG. 7, the front cover 14 is a ring body and has an inner diameter slightly smaller than an inner diameter of the motor base tube 12. The one-way bearing bracket 42 passes through an inside of the front cover 14, and a portion of the second tube section 422 extends rightward out of the surrounding range of the front cover 14. A protruding ring portion 424 is formed by protruding outward from the portion of the second tube section extending out of the front cover 14. The right bearing 142 fit around a portion of the outer peripheral surface of the second tube section 422 located on a left side of the protruding ring portion 424. The sprocket base 48 is a hat-shaped disc body and is engaged with the protruding ring portion 424 of the second tube section 422 through an inner peripheral edge of the sprocket base 48 for fixing. An outer peripheral surface of the sprocket base 48 has a threaded portion 481, wherein a stop flange 482 is formed on a left-end of the threaded portion 481. A right side of the stop flange 482 is attached to a sprocket gasket 483. A tightening ring 484 is engaged with the threaded portion 481.

In the current embodiment, a shortest distance between the outer peripheral surface of the first tube section 421 and the inner peripheral surface of the second tube section 422 in the radial direction of the crank spindle 50 is equal to a shortest distance between the inner peripheral surface and the outer peripheral surface of the first one-way bearing 44 in the radial direction of the crank spindle 50, and is also equal to a shortest distance between the inner peripheral surface and the outer peripheral surface of the second one-way bearing 46 in the radial direction of the crank spindle 50. The middle section 423 is an annular sheet body. extending outward along a direction perpendicular to the shaft axis L. As the first one-way bearing 44 and the second one-way bearing 46 are designed to use components of the same size and to be respectively and correspondingly arranged on the left side and the right side of the middle section 423, the varieties of components could be reduced and a diameter of the motor base 10 could be decreased, thereby miniaturizing the motor base 10.

It must be pointed out that the embodiments described above are only some preferred embodiments of the present invention. All equivalent structures which employ the concepts disclosed in this specification and the appended claims should fall within the scope of the present invention.

What is claimed is:
1. A coaxial mid-drive power device of a bicycle, comprising:
a motor base, wherein a shaft axis is defined on an axis of the motor base; a hollow shaft motor disposed in the motor base and having a hollow shaft at a position of the hollow shaft motor corresponding to the shaft axis;
a reducing structure disposed in the motor base, wherein two opposite sides of the reducing structure respectively have an input end and an output end;
the input end is engaged with the hollow shaft, and the output end has a sleeve; the reducing structure has a shaft hole at a position of the reducing structure corresponding to the shaft axis;
a sprocket driving assembly having a one-way bearing bracket, wherein the one-way bearing bracket has a first tube section, a second tube section, and a middle section connected between the first tube section and the second tube section;
an outer diameter of the first tube section is smaller than an inner diameter of the second tube section;
a first one-way bearing fits around an outer peripheral surface of the first tube section;
the first one-way bearing fits in an inner peripheral surface of the sleeve;

an inner peripheral surface of the second tube section fits around a second one-way bearing; a rotation direction of the second one-way bearing is opposite to a rotation direction of the first one-way bearing;

the second tube section is engaged with a sprocket base;

a crank spindle penetrating through the hollow shaft, the shaft hole, and the one-way bearing bracket along the shaft axis, wherein two ends of the crank spindle respectively penetrate through two sides of the motor base;

a side of the crank spindle has a wheel portion having a larger diameter than other portions of the crank spindle;

the wheel portion fits in an inner peripheral surface of the second one-way bearing;

another side of the crank spindle has a groove, wherein an inner surface of the groove is engaged with a strain gauge; and a signal transmission assembly having a rotary base fitting around a portion of the crank spindle that has the groove or is in contact with the groove;

the rotary base has a ring portion, wherein the ring portion is engaged with a circuit board electrically connected to the strain gauge;

a control circuit board electrically connected to the hollow shaft motor is fixed in the motor base, wherein the circuit board and the control circuit board face each other;

an elastic sheet assembly is disposed on either the circuit board or the control circuit board, and an annular conductive rail assembly is disposed on a surface of the other one of the circuit board and the control circuit board;

the elastic sheet assembly elastically abuts against the annular conductive rail assembly in a direction parallel to the shaft axis to be electrically connected to the annular conductive rail assembly.

2. The coaxial mid-drive power device as claimed in claim 1, wherein the elastic sheet assembly comprises a plurality of elastic sheets linearly arranged in a radial direction of the crank spindle;

the annular conductive rail assembly comprises a plurality of conductive rails that is annular, wherein the number of the plurality of conductive rails matches with the number of the plurality of elastic sheets;

diameters of the plurality of conductive rails increase outward along the radial direction of the crank spindle;

each of the plurality of elastic sheets elastically abuts against one of the plurality of conductive rails.

3. The coaxial mid-drive power device as claimed in claim 2, wherein two elastic sheet assemblies that are the same as the elastic sheet assembly are additionally disposed on either the circuit board or the control circuit board having the elastic sheet assembly;

the three elastic sheet assemblies comprise the number of the plurality of elastic sheets and an arrangement of the plurality of elastic sheets the same as one another;

the three elastic sheet assemblies are arranged around the shaft axis, so that each of the plurality of conductive rails is in contact, at the same time, with the plurality of elastic sheets of the three elastic sheet assemblies that are arranged in the same sequence in the radial direction of the crank spindle.

4. The coaxial mid-drive power device as claimed in claim 1, wherein the rotary base has a cylindrical portion;

the cylindrical portion fits around the crank spindle for fixing;

the ring portion is engaged around a periphery of the cylindrical portion;

the circuit board is a circuit board that is annular and fits around the periphery of the cylindrical portion;

a through opening penetrates through the cylindrical portion; an opening communicating with the through opening penetrates through the ring portion;

an electric wire is connected between the circuit board and the strain gauge;

the electric wire extends outward from the through opening to the opening to be electrically connected to the circuit board.

5. The coaxial mid-drive power device as claimed in claim 1, wherein the motor base has a motor base tube;

the hollow shaft motor and the reducing structure respectively fit in a left side and a right side in the motor base tube;

a right-end edge of the motor base tube is engaged with a front cover, and a left-end edge of the motor base tube is engaged with a rear cover;

a middle of the rear cover has a left bearing bracket, wherein a left bearing fits in the left bearing bracket;

a right-end and a left-end of the crank spindle respectively penetrate through a center of the front cover and the left bearing.

6. The coaxial mid-drive power device as claimed in claim 5, wherein the front cover is an annular body;

a right spacer ring and a right bearing respectively fit in a left side and a right side of an inner peripheral surface of the front cover;

the right spacer ring is disposed between an outer peripheral surface of the sleeve and the inner peripheral surface of the front cover;

at least a portion of an outer peripheral surface of the second tube section fits in an inner peripheral surface of the right bearing for engaging, and another portion of the second tube section extends rightward out of a surrounding range of the front cover;

a protruding ring portion is formed by protruding outward from the another portion of the second tube section that extends out of the front cover;

the sprocket base is a hat-shaped disc body and is engaged with the protruding ring portion through an inner peripheral edge of the sprocket base by screwing.

7. The coaxial mid-drive power device as claimed in claim 6, wherein an outer peripheral surface of the sprocket base has a threaded portion;

a left-end of the threaded portion forms a stop flange;

a sprocket gasket is attached to a right side of the stop flange;

a tightening ring is engaged with the threaded portion.

8. The coaxial mid-drive power device as claimed in claim 1, wherein a shortest distance between the outer peripheral surface of the first tube section and the inner peripheral surface of the second tube section in a radial direction of the crank spindle is equal to a shortest distance between an inner peripheral surface and an outer peripheral surface of the first one-way bearing in the radial direction of the crank spindle, and is also equal to a shortest distance between an inner peripheral surface and an outer peripheral surface of the second one-way bearing in the radial direction of the crank spindle.

9. The coaxial mid-drive power device as claimed in claim 1, wherein
an end of the hollow shaft facing the reducing structure forms a large-diameter portion having an inner diameter greater than other portions of the hollow shaft;
a plurality of keyways are formed on an inner peripheral surface of the large-diameter portion; the reducing structure is a planetary gear reducer and the input end is a driving gear, wherein a portion of the driving gear extends into the large-diameter portion of the hollow shaft;
a plurality of key blocks respectively fits in one of the plurality of keyways, wherein an inside of the plurality of key blocks fits in a periphery of the driving gear for fixing.

10. The coaxial mid-drive power device as claimed in claim 9, wherein
the reducing structure has an internal gear ring fixed in the motor base;
a first-stage carrier and a second-stage carrier are respectively disposed on two sides in the internal gear ring;
a plurality of first planetary gears is engaged with a side surface of the first-stage carrier facing away from the second-stage carrier and is arranged around the shaft axis, wherein an outside of each of the plurality of first planetary gears is meshed with the internal gear ring, and an inside of each of the plurality of first planetary gears is meshed with another portion of the driving gear;
a plurality of second planetary gears is engaged between another side surface of the first-stage carrier and the second-stage carrier and is arranged around the shaft axis, wherein an outside of each of the plurality of second planetary gears is meshed with the internal gear ring, and an inside of each of the plurality of second planetary gears is meshed with a sun gear;
the sleeve is concentrically engaged with the second-stage carrier and protrudes from a coverage range of the internal gear ring.

11. The coaxial mid-drive power device as claimed in claim 1, wherein
an end of the hollow shaft facing the reducing structure forms a large-diameter portion having an inner diameter greater than other portions of the hollow shaft;
a slot that is non-circular is formed on an inner peripheral surface of the large-diameter portion;
the reducing structure is a planetary gear reducer and the input end is a driving gear;
a side wall of the driving gear is concentrically engaged with a fitting ring fitting in the slot for fixing.

* * * * *